United States Patent [19]
Koenig

[11] Patent Number: 6,166,789
[45] Date of Patent: Dec. 26, 2000

[54] LIQUID CRYSTAL DISPLAY

[75] Inventor: Walter Koenig, Neusaess, Germany

[73] Assignee: NCR Corporation, Dayton, Ohio

[21] Appl. No.: 08/279,304

[22] Filed: Jul. 21, 1994

[51] Int. Cl.[7] .................................................. G02F 1/1333
[52] U.S. Cl. ............................................. 349/86; 349/114
[58] Field of Search .................................. 359/51, 52, 49; 349/86, 114

[56] References Cited

FOREIGN PATENT DOCUMENTS

| 0337711 | 10/1989 | European Pat. Off. . |
| 0352818 | 1/1990 | European Pat. Off. . |
| 0435676 | 7/1991 | European Pat. Off. . |
| 0543658 | 5/1993 | European Pat. Off. . |
| 3-166515 | 7/1991 | Japan ...................................... 359/51 |
| 5-196940 | 8/1993 | Japan ...................................... 349/49 |

*Primary Examiner*—Kenneth Parker
*Attorney, Agent, or Firm*—Paul J. Maginot

[57] ABSTRACT

The invention concerns Liquid Crystal Displays (LCD), in which Polymer-Dispersed Liquid Crystal (PDLC) is used. PDLC does not require the use of polarizing filters and half-reflective mirrors, as do some other LCDs. Eliminating the polarizing filters and mirrors eliminates the light attenuation which the filters and mirrors cause. Thus, less light input is required, which increases battery life in devices which are battery-powered. The invention provides a color display by applying color filters to each pixel, and by edge-illuminating the PDLC.

4 Claims, 22 Drawing Sheets

INCOMING LIGHT

NO TRANSMISSION

INCOMING LIGHT

TRANSMISSION OCCURS

LIQUID CRYSTAL DISPLAY

The invention concerns liquid-crystal displays. More specifically, the invention concerns such displays which use polymer-dispersed liquid crystals (PDLC). Such liquid crystals eliminate the need for polarizing filters and half-reflective mirrors, which are required in some types of liquid crystal display. Elimination of the filters and mirrors reduces light loss attributable to the filters and mirrors, and thereby increases battery life in battery-powered displays.

Liquid Crystal Operation

FIG. 1 illustrates a Liquid Crystal Display, LCD, which will be assumed to be of the Twisted Nemetic type, TN. Individual pixels are labeled in the upper left corner. In a computer display, the number of pixels can be quite large. A commonly used type of LCD contains 480 rows×640 columns of pixels, giving 307,200 pixels total.

Each PIXEL of FIG. 1 contains a DEVICE shown in FIG. 2, which is controlled by a transistor, labeled MOS. The DEVICE is shown in greater detail in FIGS. 3 and 4. FIG. 3 is a simplified version of FIG. 4.

The DEVICE in FIG. 3 contains two plates P, which act as the plates of a parallel-plate capacitor. The two plates P take the form of two films of indium tin oxide, ITO, shown in FIG. 4, which are supported by GLASS sheets. ITO is conductive and transparent to visible light. The dielectric of the capacitor in FIG. 3 is a liquid crystal material, as indicated in the Figures.

Each film of ITO bears a coating of polyimide (not shown). The polyimide has been buffed during manufacture, in order to create parallel scratches on the surface of the polyimide. When a liquid crystal is placed between the plates P (that is, between the ITO films), the scratches induce those molecules of the liquid crystal, which are adjacent the scratches, to align with the scratches. For example, in FIG. 5, molecules M1 and M2 align as shown (scratches are not shown).

The plates P are assembled such that the scratches, and thus molecules M1 and M2, are perpendicular to each other, as shown. After assembly of the plates, the molecules located in the bulk of the liquid crystal try to align themselves with M1 and M2. However, because M1 and M2 are perpendicular, the bulk molecules are forced to align into a helix H which bridges M1 and M2, as shown in FIG. 6.

Polarizing filters are affixed to each sheet of GLASS in FIG. 6, as indicated. When incoming LIGHT enters, as shown in FIG. 7, the polarization of the LIGHT follows the helix H in FIG. 6, and the LIGHT undergoes a continuous 90-degree twist, as shown in FIG. 7, and exits through the bottom polarizing filter. The pixel appears bright to a viewer 50, because of the exiting LIGHT.

However, when a small voltage (such as 3–5 volts) is applied between the ITO plates, the voltage creates an ELECTRIC FIELD in FIG. 8, which disturbs the gradual twist of the molecules, as indicated by the disarray of the MOLECULES. The helix no longer exists. The light is no longer twisted as it travels, but is blocked by the lower polarizing filter, as shown in FIG. 9. The pixel appears dark to a viewer 50.

FIGS. 10 and 11 illustrate the two pixel conditions by showing different shading. In FIG. 10, a light-blocking pixel is indicated by hatching. In FIG. 11, a light-transmitting pixel is indicated as hollow.

DEVICEs Used as Display

When the DEVICEs of FIGS. 3 and 4 are used in a display, a mirror is placed behind them, as shown in FIGS. 12 and 13. A viewer 50 sees a light-blocking pixel as dark, as in FIG. 12, because no light is reflected by the MIRROR.

In contrast, the viewer 50 in FIG. 13 sees the light-transmitting pixel as bright, because the MIRROR reflects the transmitted light. (Light in FIG. 13 follows the helix shown in FIG. 6 in both directions, and is thus transmitted through the liquid crystal both en route to, and after reflection from, the MIRROR.)

To use these pixels in a display, one can arrange them as shown in FIG. 14, which shows a 5×7 array of the DEVICEs shown in FIGS. 3 and 4. The activated, hatched pixels appear dark (as does that in FIG. 12), while the non-activated, transmissive pixels appear bright (as does that in FIG. 13). The display shows the letter "A", as dark on a light background.

To use the apparatus in low-light conditions, the MIRROR in FIG. 14 can be replaced by a PARTIALLY TRANSMISSIVE MIRROR, as in FIG. 15. A LIGHT SOURCE transmits light through the PARTIALLY TRANSMISSIVE MIRROR. Again, as in FIG. 14, the hatched pixels appear dark, and the hollow pixels appear bright. (When the apparatus is used in ambient light, the PARTIALLY TRANSMISSIVE MIRROR reflects incoming light as does the MIRROR in FIG. 14.)

Color Display

The preceding discussion considered a monochromatic display. The PIXELs in FIG. 1 can be arranged to display colors. One approach is to place three DEVICEs within each PIXEL, as shown in FIG. 16. Each DEVICE bears a color filter: a RED, a GREEN, and a BLUE filter are shown.

Selectively actuating one or more of the DEVICEs allows the PIXEL to produce color combinations of RED, GREEN, and BLUE. Further, greater numbers of combinations can be attained by applying different voltages to the DEVICEs, thus producing different intensities of RED, GREEN and BLUE.

For example, if a single voltage is applied to each DEVICE, then 8 possible combinations exist (that is, 2 raised to the power 3), as shown in the following TABLE.

TABLE

| RED | GREEN | BLUE |
|---|---|---|
| OFF | OFF | OFF |
| OFF | OFF | ON |
| OFF | ON | OFF |
| OFF | ON | ON |
| *** | *** | *** |
| ON | ON | ON |

However, if each color has three possible values, namely, OFF, BRIGHT, and DIM then a larger number of combinations is available.

Problem

FIG. 17 illustrates a cross-sectional view of the apparatus of FIG. 16, together with a 50% REFLECTIVE MIRROR, which represents the PARTIALLY TRANSMISSIVE MIRROR of FIG. 15. FIG. 17 illustrates, in a very approximate way, how the INCOMING LIGHT is attenuated by the various components. Similar attenuation occurs in the light reflected by the MIRROR.

When the apparatus of FIG. 17 is illuminated by ambient light, this attenuation is not a large problem, because there is no cost in obtaining the ambient light. However, if the apparatus is illuminated by LIGHT SOURCE of FIG. 15, which would be located below the 50% REFLECTIVE MIRROR in FIG. 17, then the LIGHT SOURCE must provide sufficient light to overcome the attenuation. The total attenuation in FIG. 17 can amount to more than 75 percent of the incoming light. (50 percent reaches the MIRROR. 50 percent of this 50 percent, or 25 percent, returns to the viewer.)

The attenuation represents wasted energy: the LIGHT SOURCE must provide the light which is attenuated, which causes extra electrical power to be consumed. This power consumption is not desired in the situation where the LCD is used in a battery-powered, portable device, such as a portable computer.

OBJECTS OF THE INVENTION

An object of the invention is to provide an improved liquid crystal display.

A further object of the invention is to provide a liquid crystal display, of the color-image type, which consumes reduced electrical power.

SUMMARY OF THE INVENTION

In one form of the invention, a Polymer Dispersed Liquid Crystal (PDLC) display is used. PDLCs do not require polarizing filters, and thus eliminate the attenuation loss due to these filters. The PDLC is illuminated by light rays, provided by a light source, which enter non-normal to the display.

DETAILED DESCRIPTION OF THE INVENTION

Figure 1:
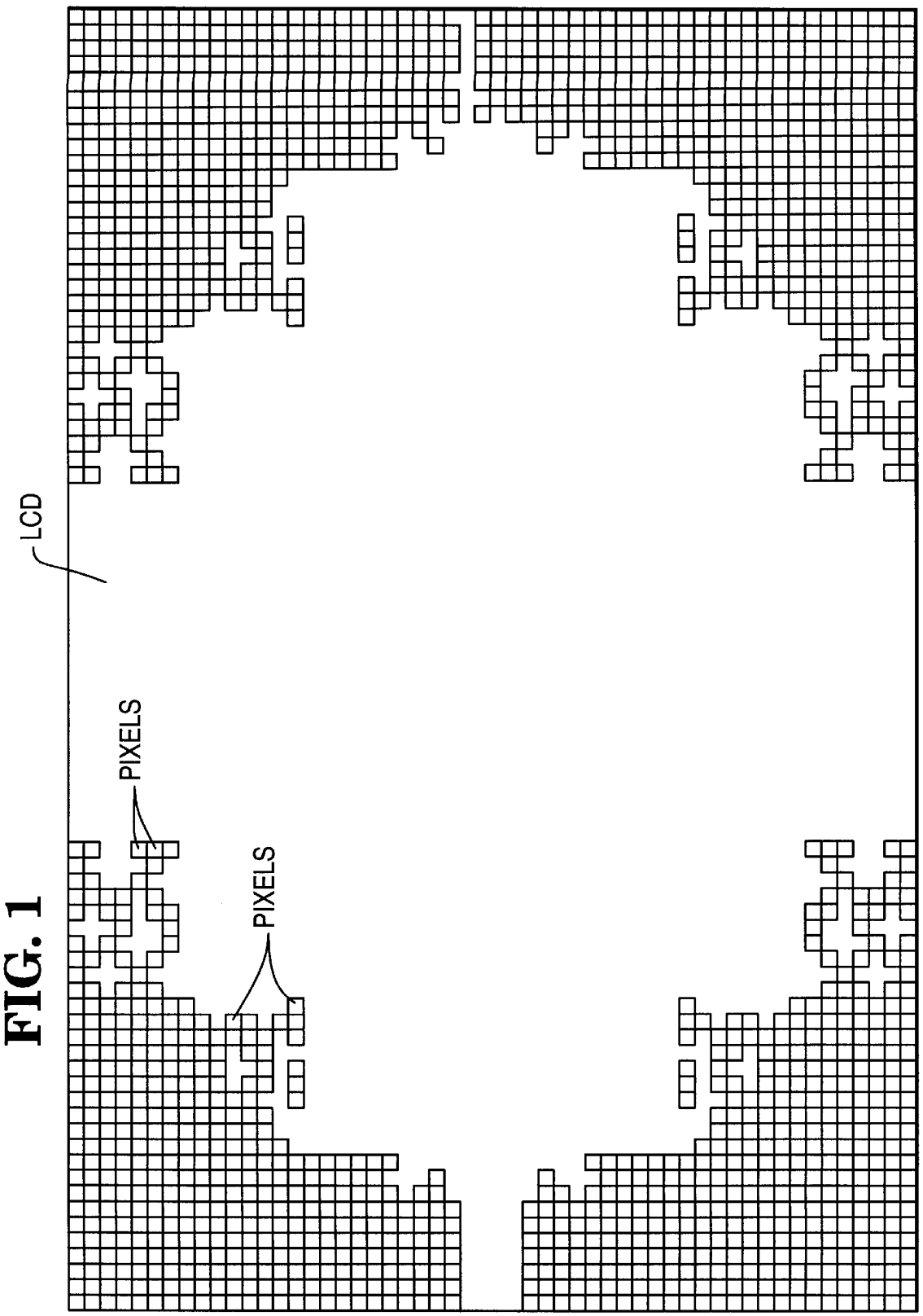
FIG. 1 illustrates a Liquid Crystal Display, LCD.
Figure 2:
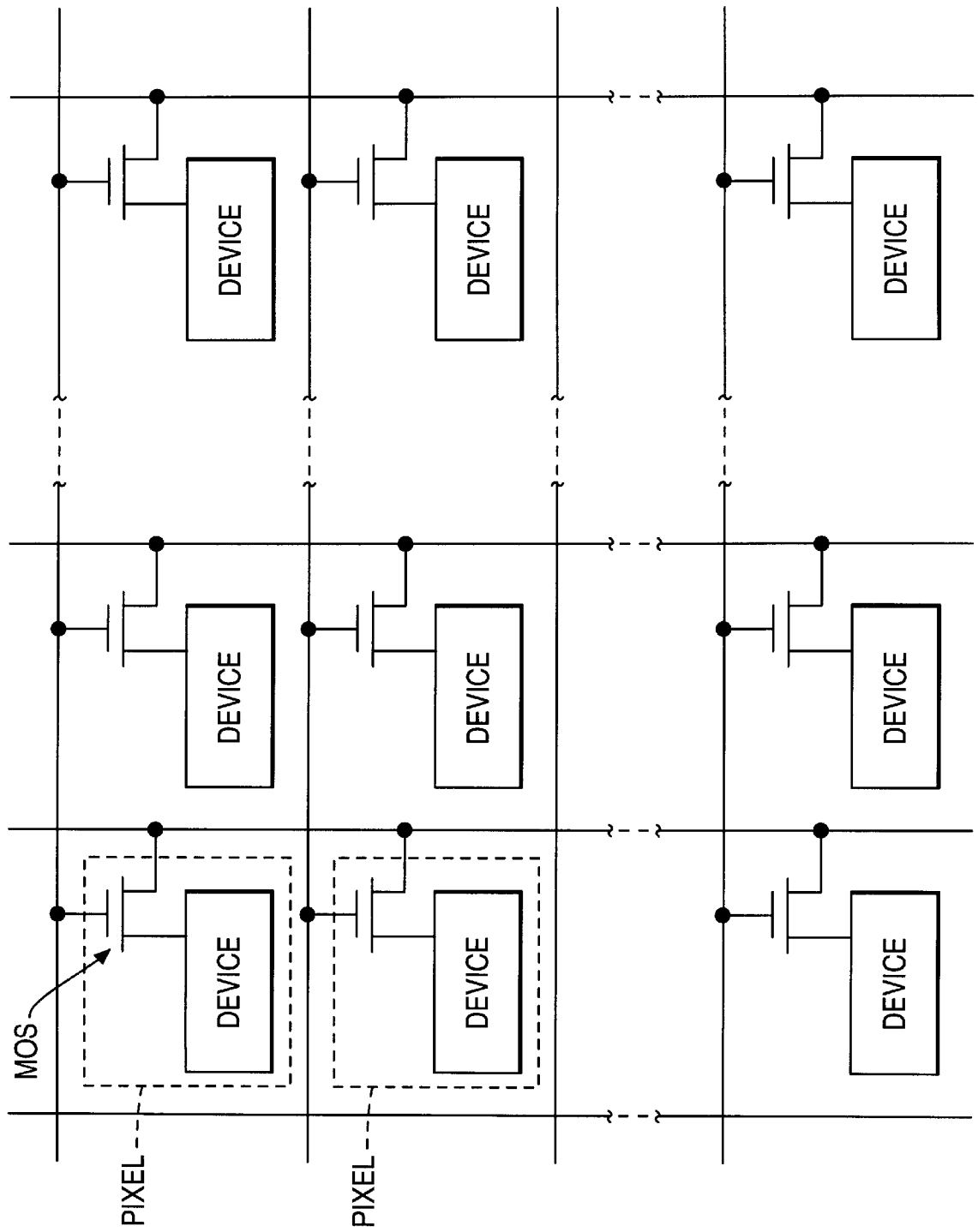
FIG. 2 illustrates DEVICEs contains within the PIXELs of the LCD.
Figure 3:
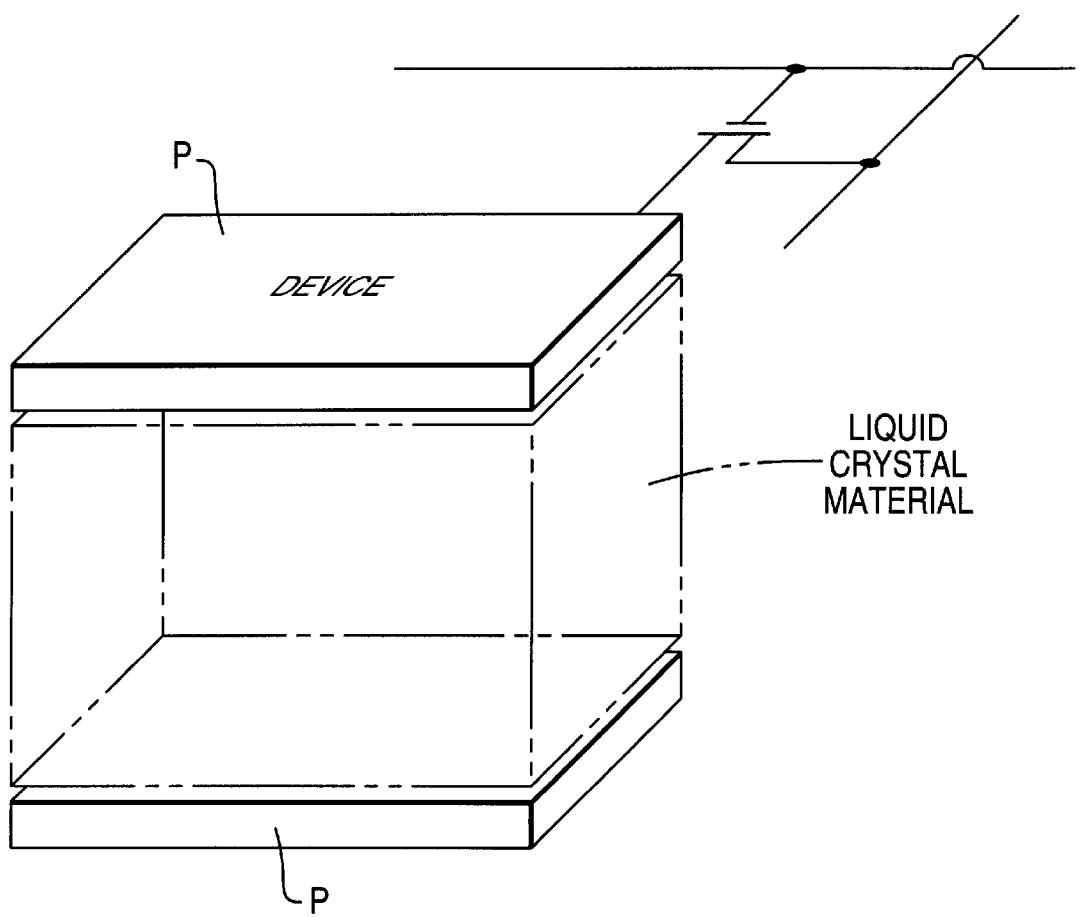
FIGS. 3 and 4 illustrate details of construction of the DEVICEs.
Figure 4:
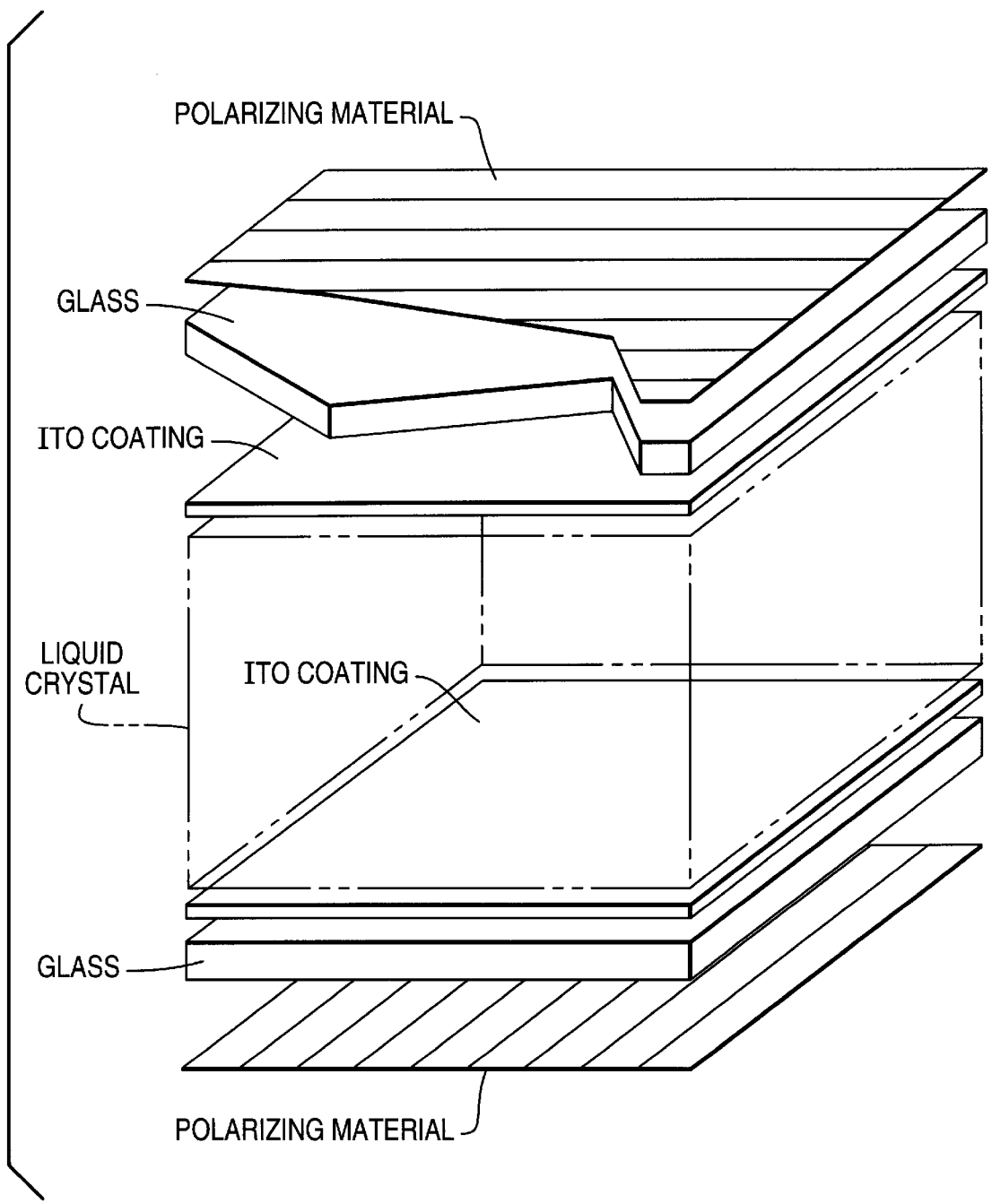
Figure 5:
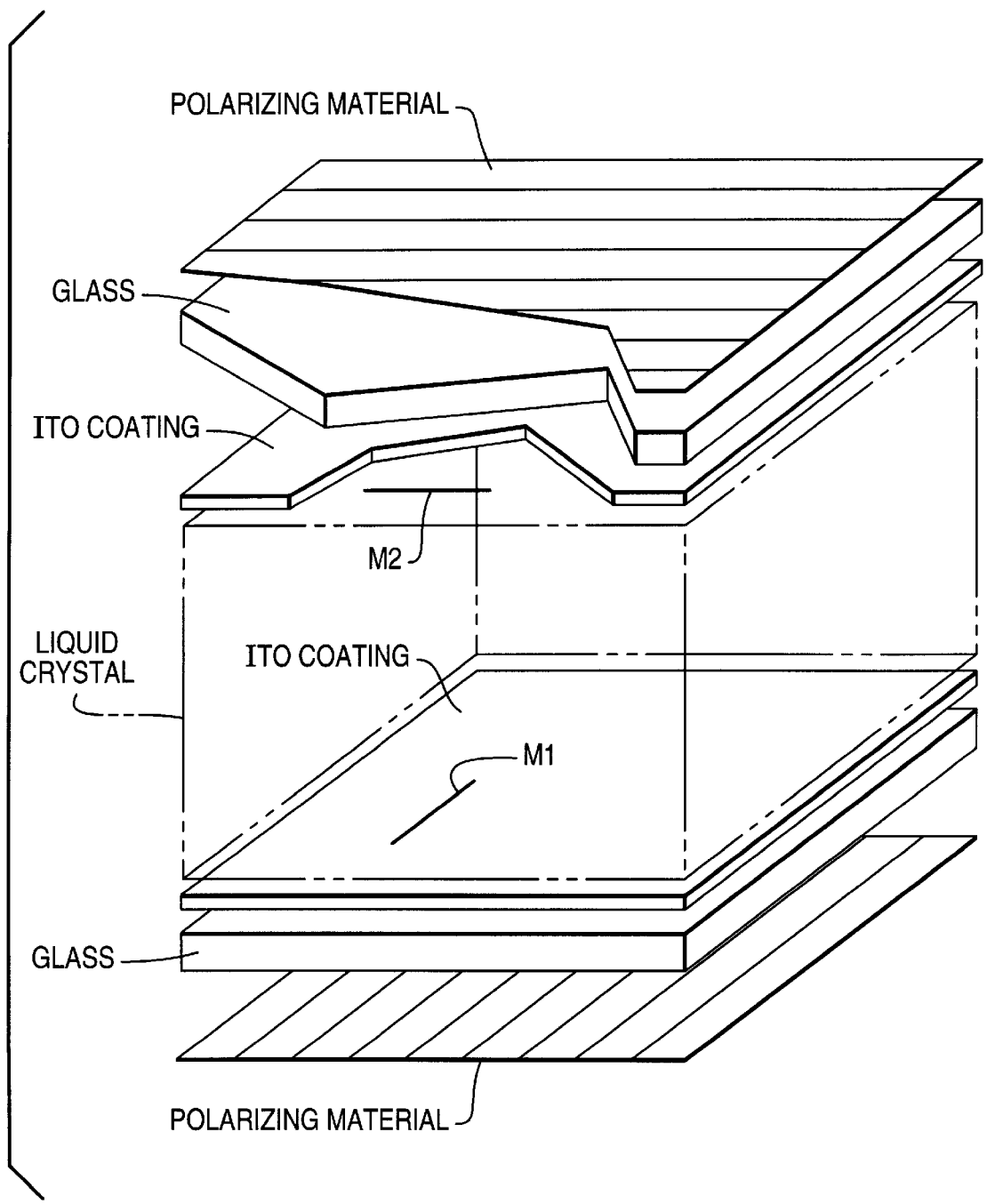
FIG. 5 illustrates two liquid crystal molecules, M1 and M2, and their relative perpendicular alignment.
Figure 18:
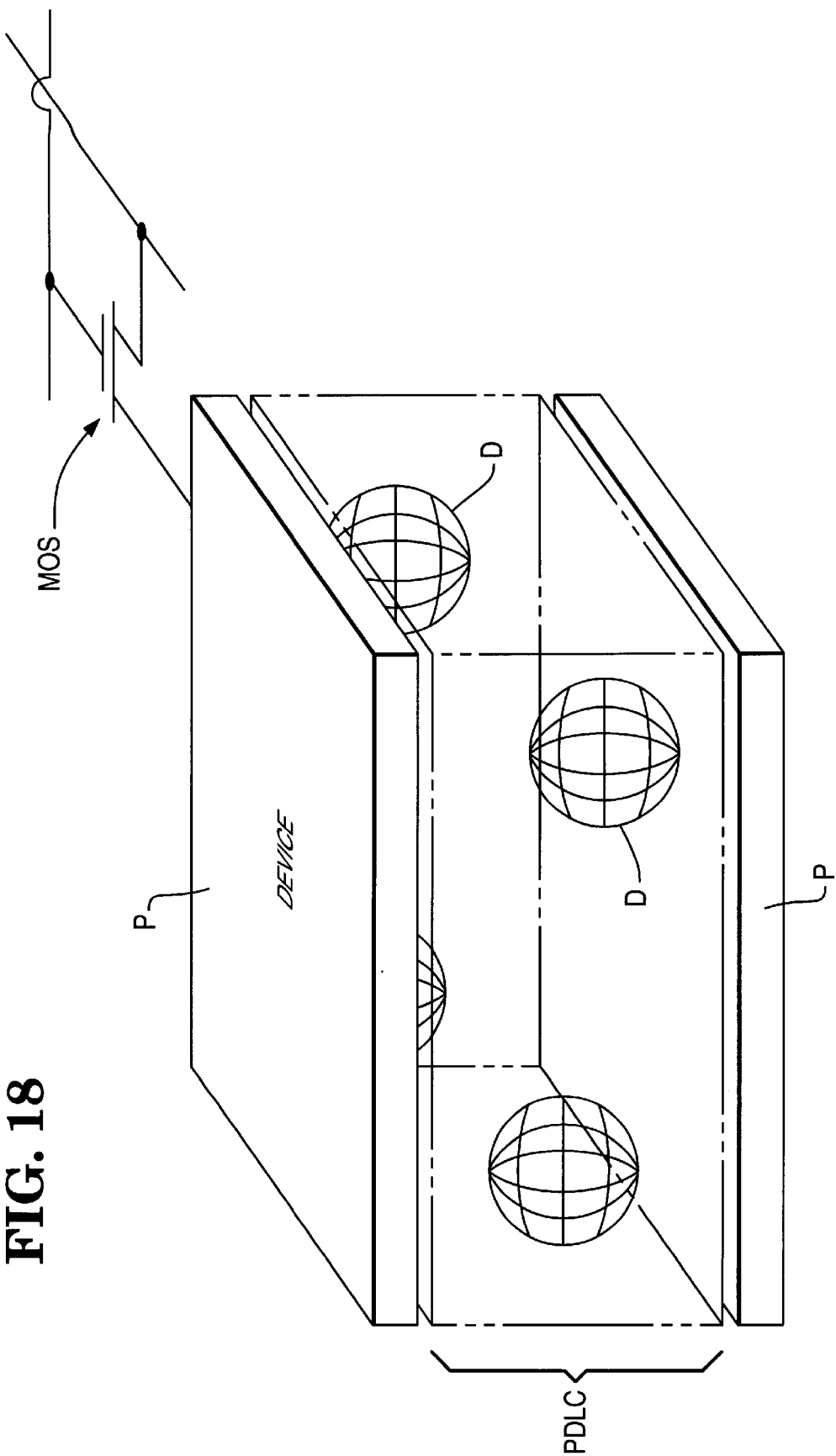
FIG. 18 illustrates a polymer-dispersed liquid crystal (PDLC) used in a DEVICE.

A DEVICE as in FIG. 3, contained within an LCD as in FIG. 1, can use a Polymer Dispersed Liquid Crystal (PDLC), as shown in FIG. 18. The PDLC acts as the dielectric of the capacitor formed by plates P. The spheres D represent droplets, or particles, of the liquid crystal.

PDLC is a commercially available product. One supplier of PDLC is Company Merck, located in Darmstadt, Germany.

Figure 19:
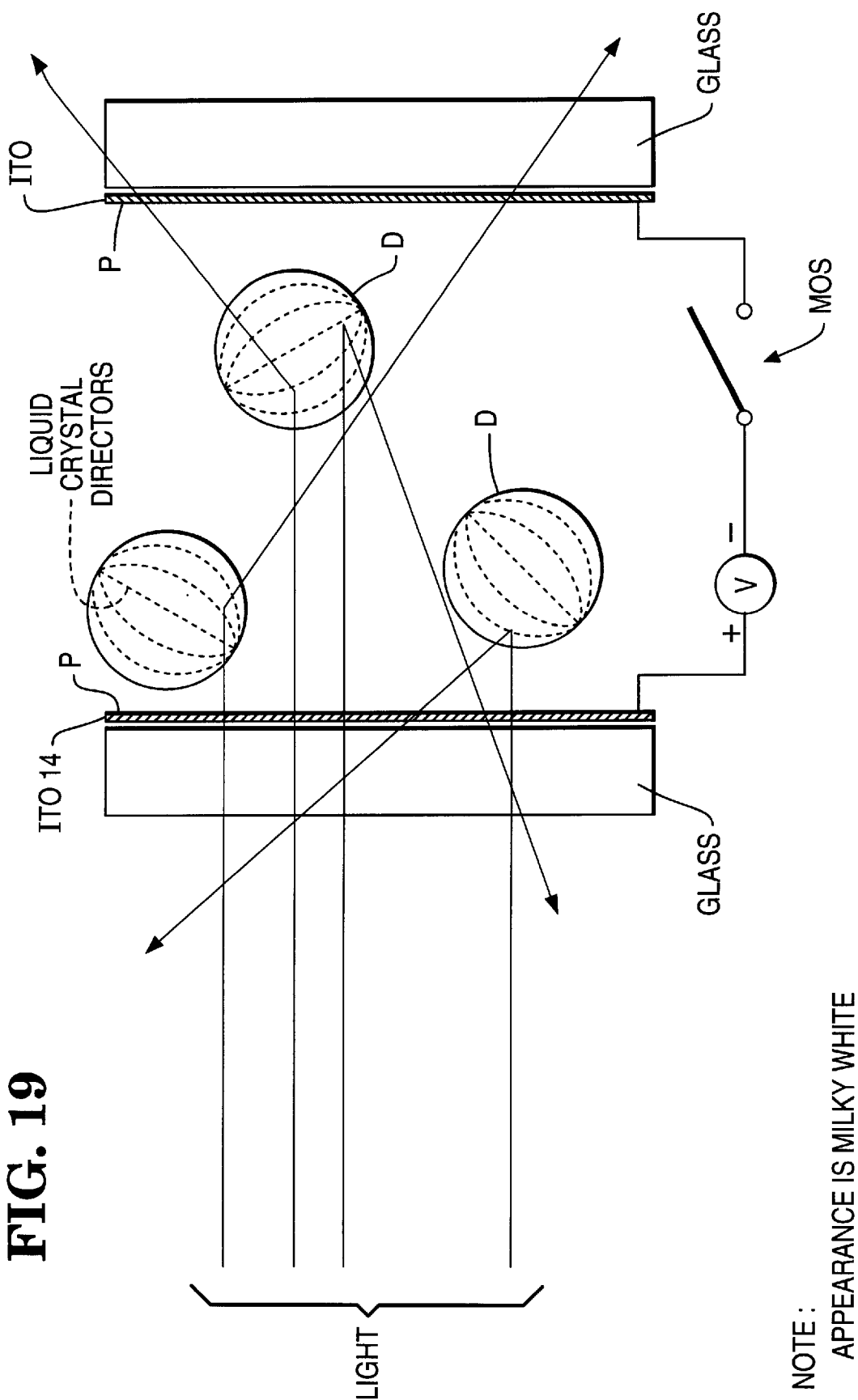
FIG. 19 illustrates the PDLC in its light-blocking, or reflective, state.

FIG. 19 is a side view of the DEVICE of FIG. 18. In FIG. 19, Indium Tin Oxide (ITO) layers, supported by GLASS sheets, act as the plates P in FIG. 18.

PDLC: Reflective State

In FIG. 19, no voltage is applied across the plates P, because the MOS acts as an open switch, as indicated. Because of the absence of voltage, and thus the absence of an electric field between the plates P, the molecules, or LIQUID CRYSTAL DIRECTORS, of the PDLC acquire a random orientation, as indicated. These randomly oriented molecules scatter incoming light, as indicated, and the PDLC appears to be milky white, or paper white, in color.

There is some resemblance, and some difference, between the reflection shown in FIG. 19, and ordinary diffuse reflection, such as diffuse reflection from a matte surface. In ordinary diffuse reflection, the reflection surface is, in the ideal case, a flat plane having no depth.

PDLC: Transmissive State

Figure 20:
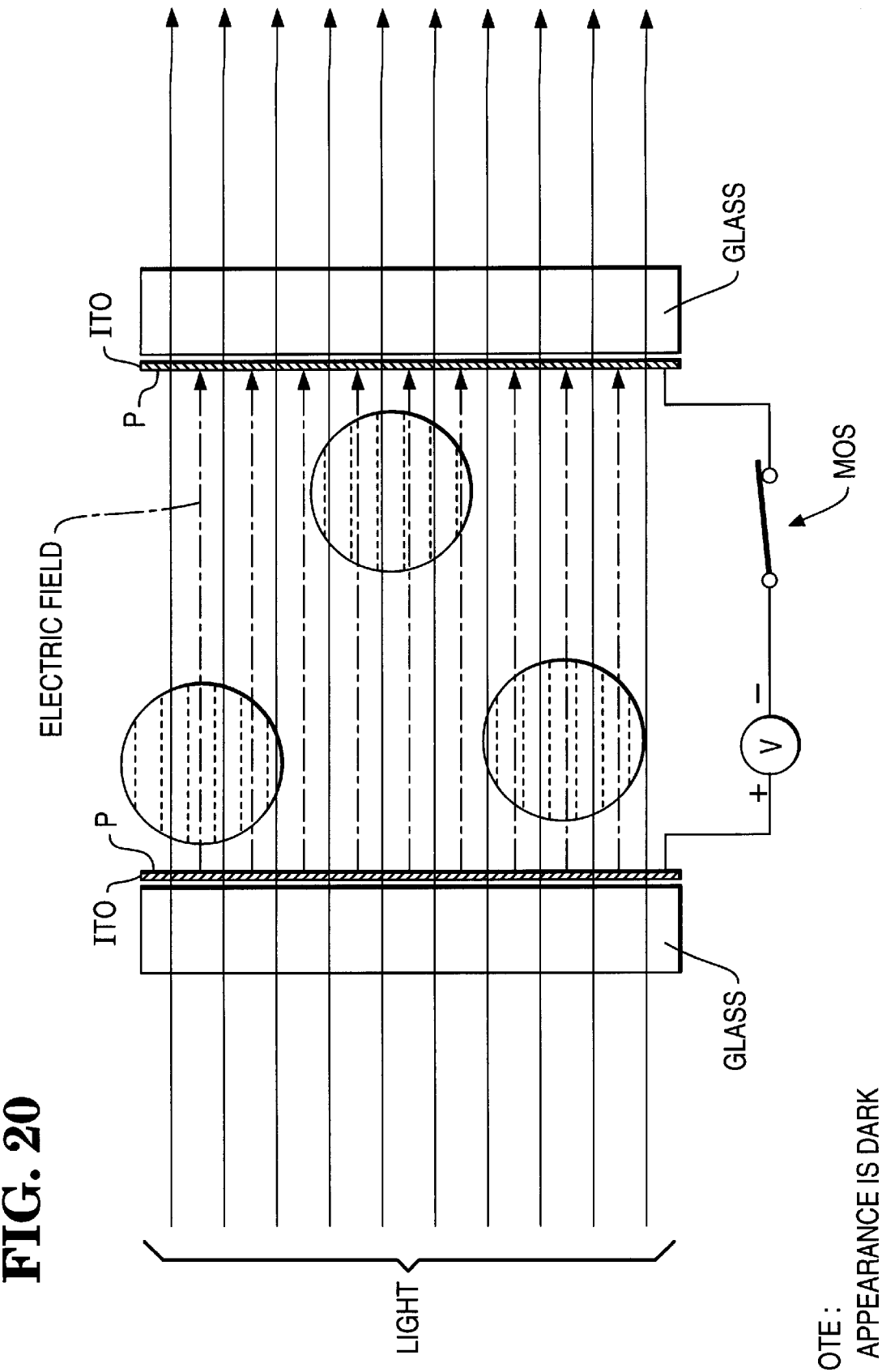
FIG. 20 illustrates the PDLC in its light-transmissive state.

When a voltage is applied across the plates P, by closure of the MOS, as in FIG. 20, an ELECTRIC FIELD is created. The molecules align with the electric field, as indicated. The PDLC now becomes transparent, as indicated by the light rays passing through the PDLC.

Edge-Illumination

Figure 21:
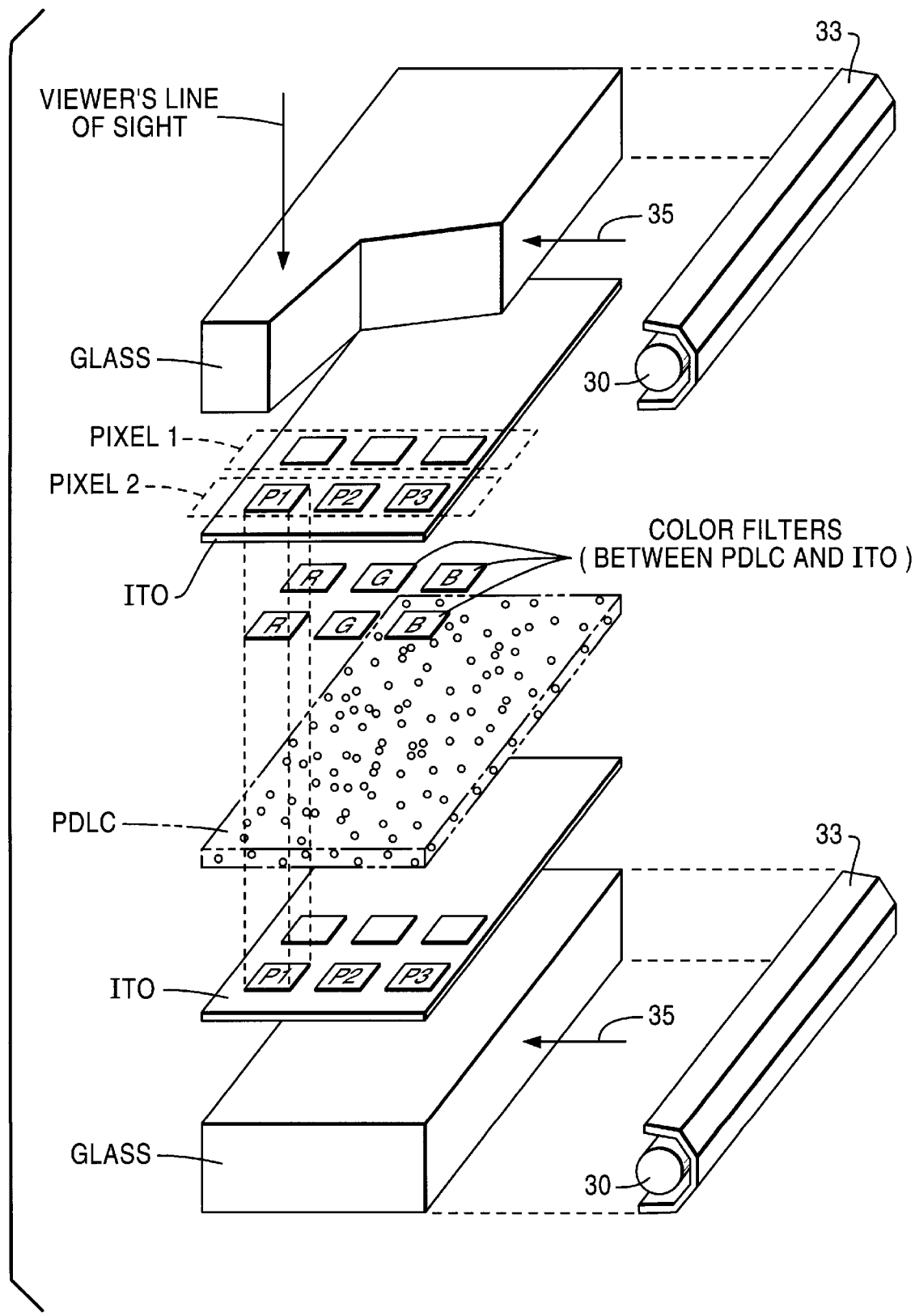
FIG. 21 illustrates one form of the invention.

The reflected light shown in FIG. 19 can be provided by one, or both, light sources 30 shown in FIG. 21, together with reflectors 33. The light sources 30 provide rays 35 which are edge-coupled with the GLASS sheets, and reflected as shown in FIG. 23 (later-discussed).

Figure 22:
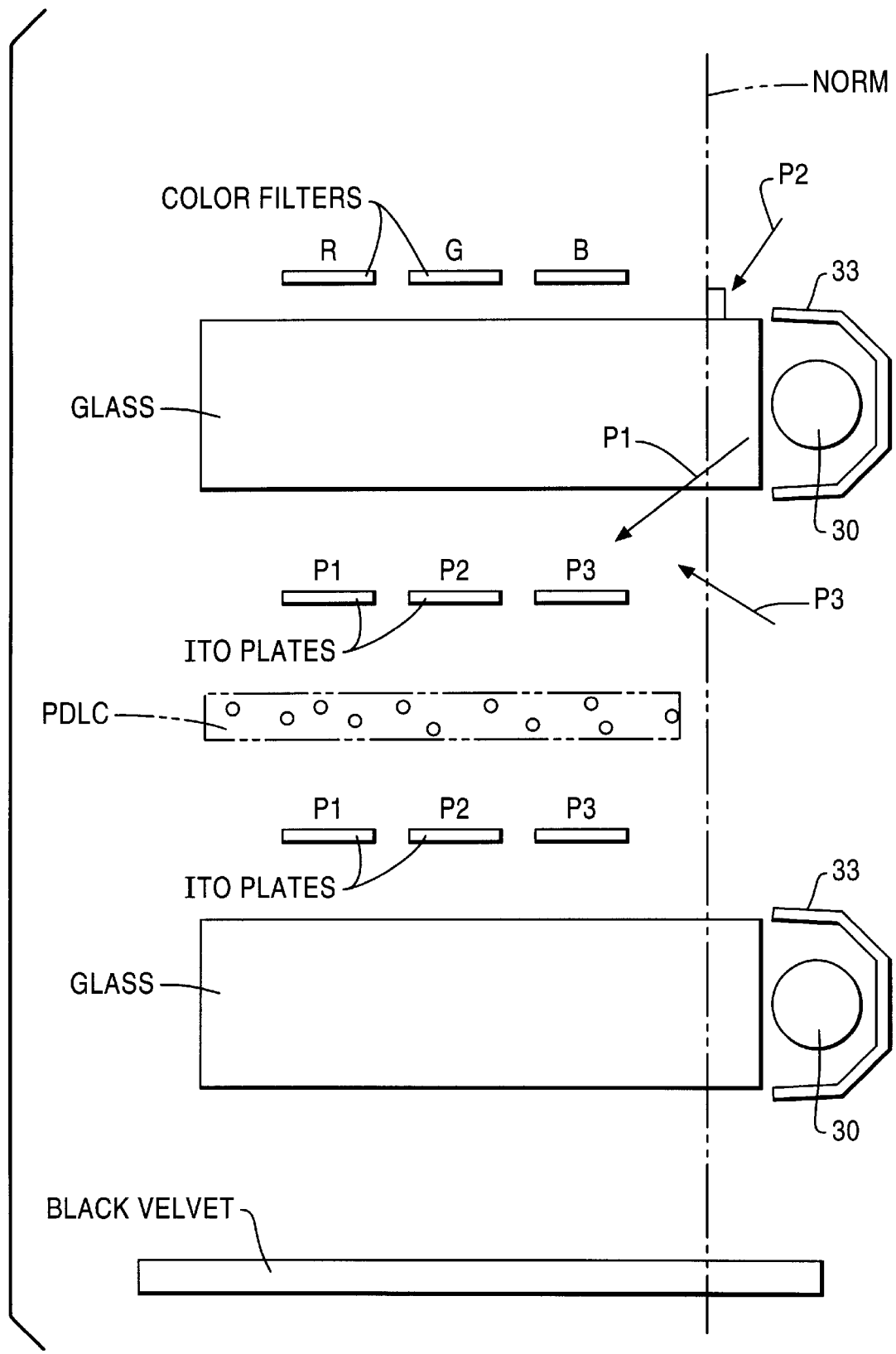
FIG. 22 is a cross-sectional view od FIG. 21, with a light-absorbing BLACK VELVET added.

FIG. 21 also shows apparatus for generating colored PIXELs. Each PIXEL (PIXEL 1 and PIXEL 2 are shown) contains three color filters, namely, red (R), green (G), and blue (B). Each filter is associated with a pair of electrodes. The red (R) filter is associated with pair P1—P1. The green (G) filter is associated with pair P2—P2, and so on. FIG. 22 illustrates FIG. 21 in cross-section.

Figure 23:
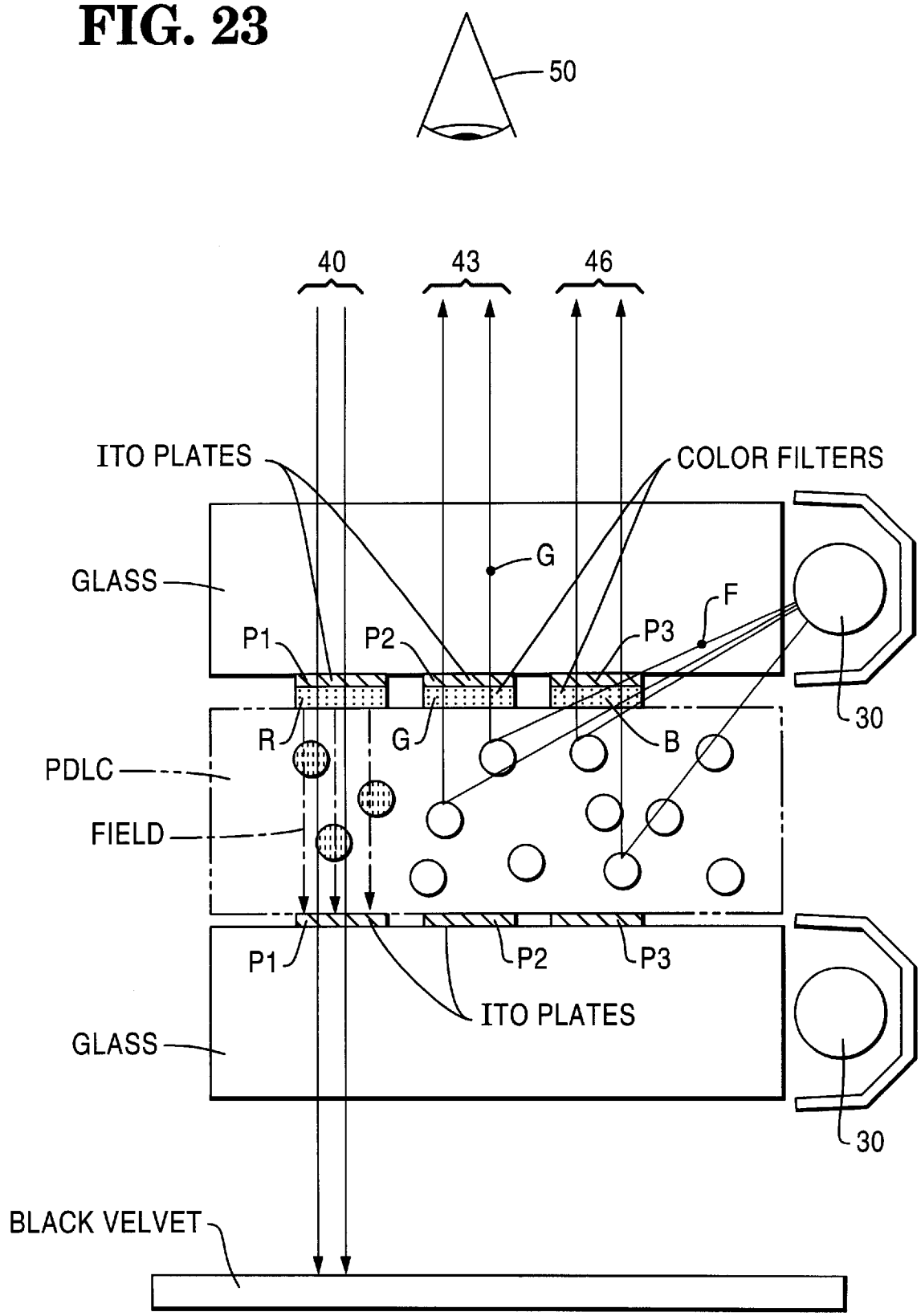
FIG. 23 illustrates how a color of a PIXEL can be controlled, using the invention.

To generate a color in a pixel, one uses a subtractive process, as shown in FIG. 23. When a field is applied to a pixel pair, as pair P1—P1, as shown, the PDLC between that pair becomes transmissive. Light provided by sources 30 is not reflected and, in fact, is transmitted through the PDLC.

The situation is as though the viewer were looking through a transparent cell, into the BLACK VELVET light absorber, as indicated by rays 40. The red (R) pixel reflects no light.

In contrast, the green (G) and blue (B) pixels are non-actuated, and are reflective. They reflect rays 43 and 46. The viewer (not shown) sees a combination of green and blue, which is a type of violet.

To obtain other colors, one simply actuates different combinations of pairs of pixels.

One Characterization of Invention

The invention can be characterized as an optical display, which includes

A sheet of polymer-dispersed liquid crystal, such as sheet PDLC in FIG. 21.

Lighting means for off-normal illumination of the sheet. That is, the light provided is not sent along the normal, perpendicular reference axis labeled NORM in FIG. 22. Rather, the light takes one of the off-normal paths, such as P1, P2, or P3. (P2 and P3 can be provided by external sources, which would probably add undesirable thickness the display.)

Figure 7:
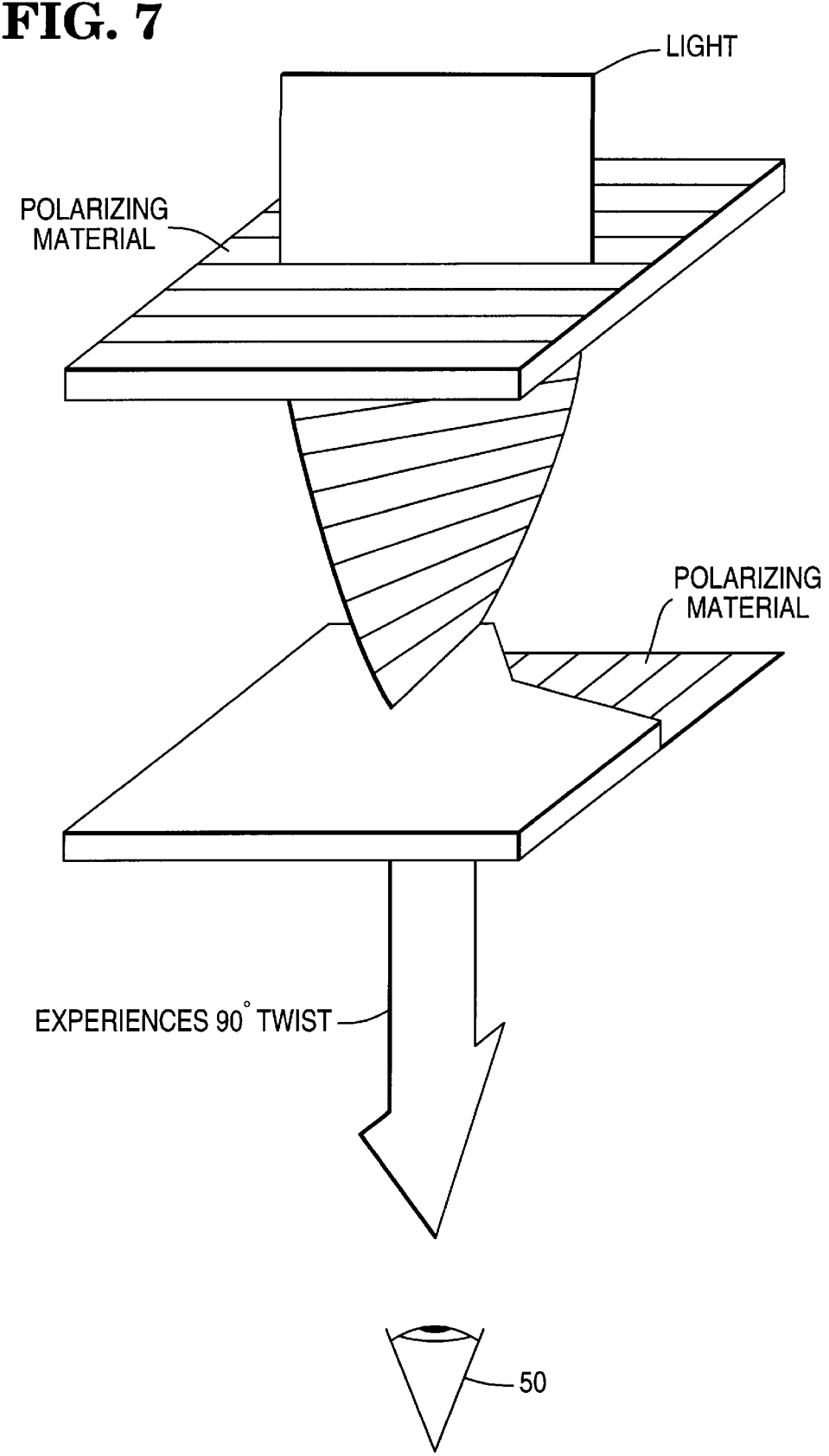
FIG. 7 illustrates light following the HELIX, and being transmitted through the DEVICE.
Figure 8:
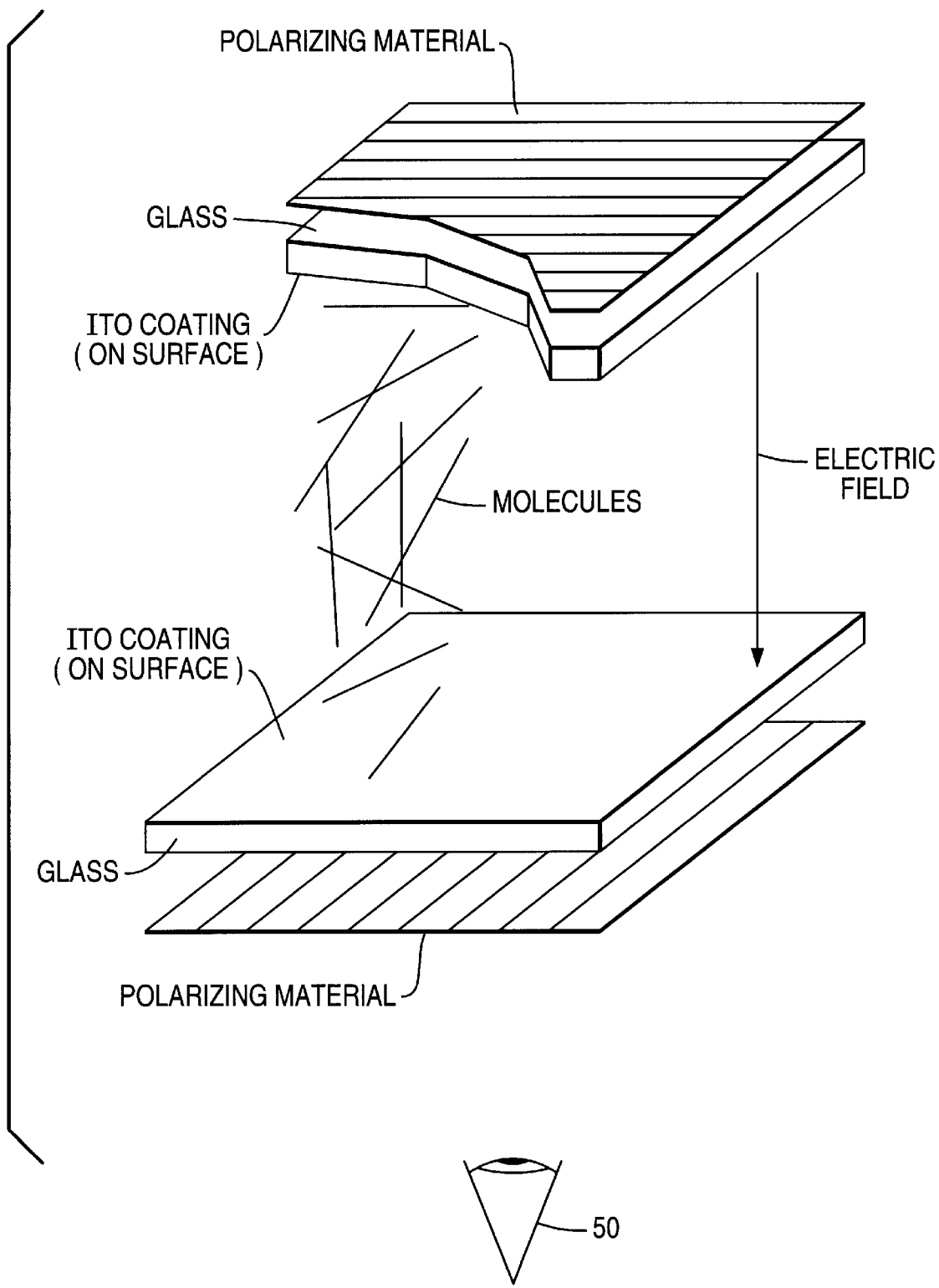
FIG. 8 illustrates how an ELECTRIC FIELD disrupts the HELIX.

Since this light is off-normal, there is no direct transmission of light from a source to the viewer, as in FIG. 7, which creates a bright pixel. Rather, the light is reflected, as indicated by rays 43 and 46 in FIG. 23, and is white, but not bright in the manner of FIG. 7.

Different-colored filters, adjacent the sheet. The red (R), green (G), and blue (B) filters in FIG. 22 represent three such filters.

Second Characterization of Invention

Another form of the invention can be characterized as an optical display which includes A sheet of polymer-dispersed liquid crystal, such as sheet PDLC in FIG. 22.

A plurality of pixels defined within said sheet, such as PIXEL 1 in FIG. 22. Each pixel contains three pairs of electrodes, such as pairs P1—P1, P2—P2, and P3—P3 in FIG. 21.

Each pair of electrodes forms a capacitor in which liquid crystal forms at least part of the dielectric. That is, as FIG. 18 indicates, the droplets D do not occupy the entire space between the plates P. Thus, the background matrix which supports the droplets forms another part of the dielectric.

Each pair of electrodes forms a capacitor through which light passes when a voltage is applied. Such light is illustrated by rays 40 in FIG. 23.

Each pair of electrodes forms a capacitor from which light is reflected when a lesser voltage is applied. Such reflected light is shown by rays 43 and 46 in FIG. 23. The term "lesser voltage" refers to the fact that zero voltage is not required to be applied to the capacitor to cause reflection as in FIG. 19.

A plurality of color filters, each associated with a capacitor, such that light reflected from a capacitor can pass through said filter, en route to a viewing region. Such filters are shown in FIG. 23. The viewing region is represented by the location of the viewer, represented by eye 50.

Lighting means for edge-illuminating said sheet. Such lighting means 30 is shown in FIG. 21.

Distinction Between TN and PDLC

Figure 9:
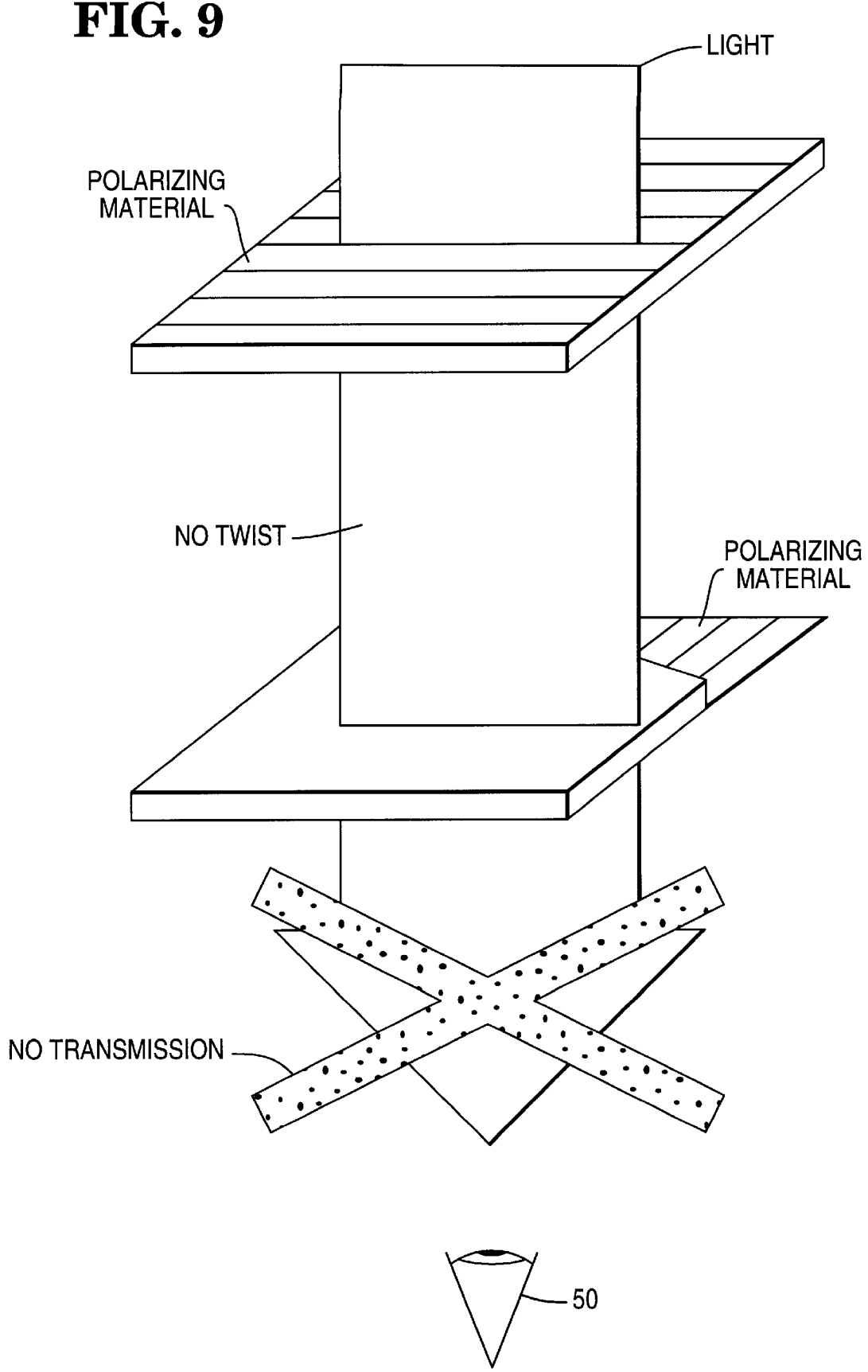
FIG. 9 illustrates how the absence of the HELIX blocks light transmission. The pixel is absorptive.
Figure 10:
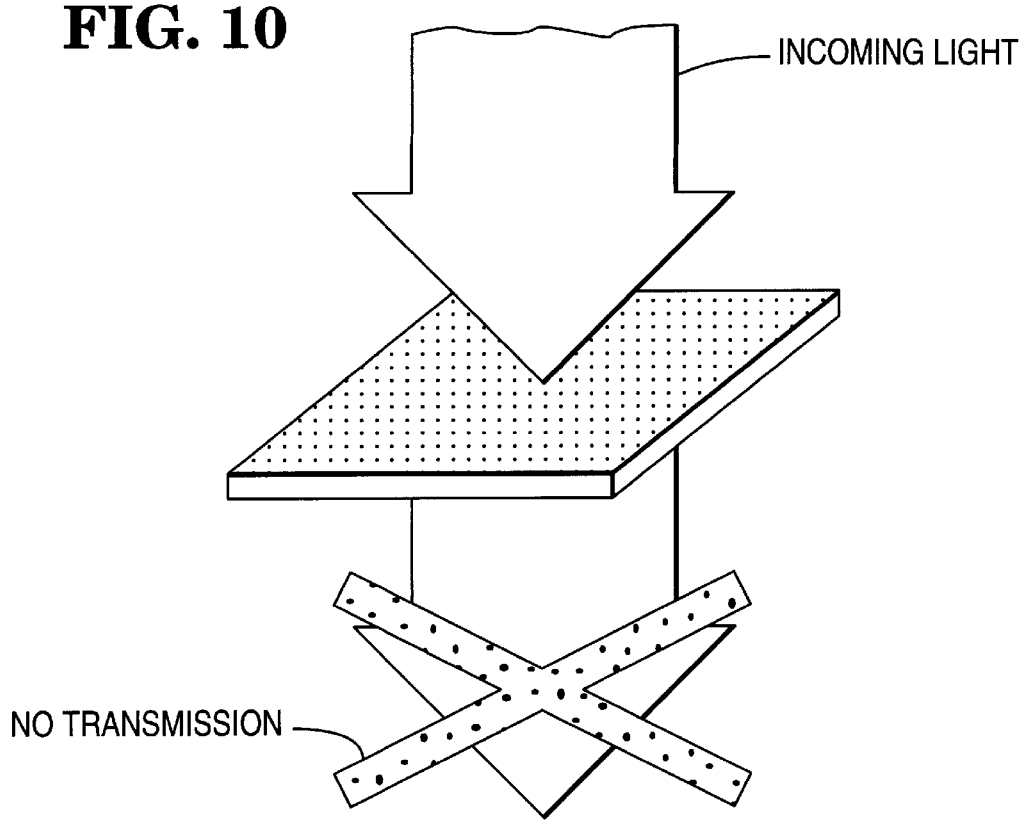
FIG. 10 illustrates a pixel which blocks light.
Figure 11:
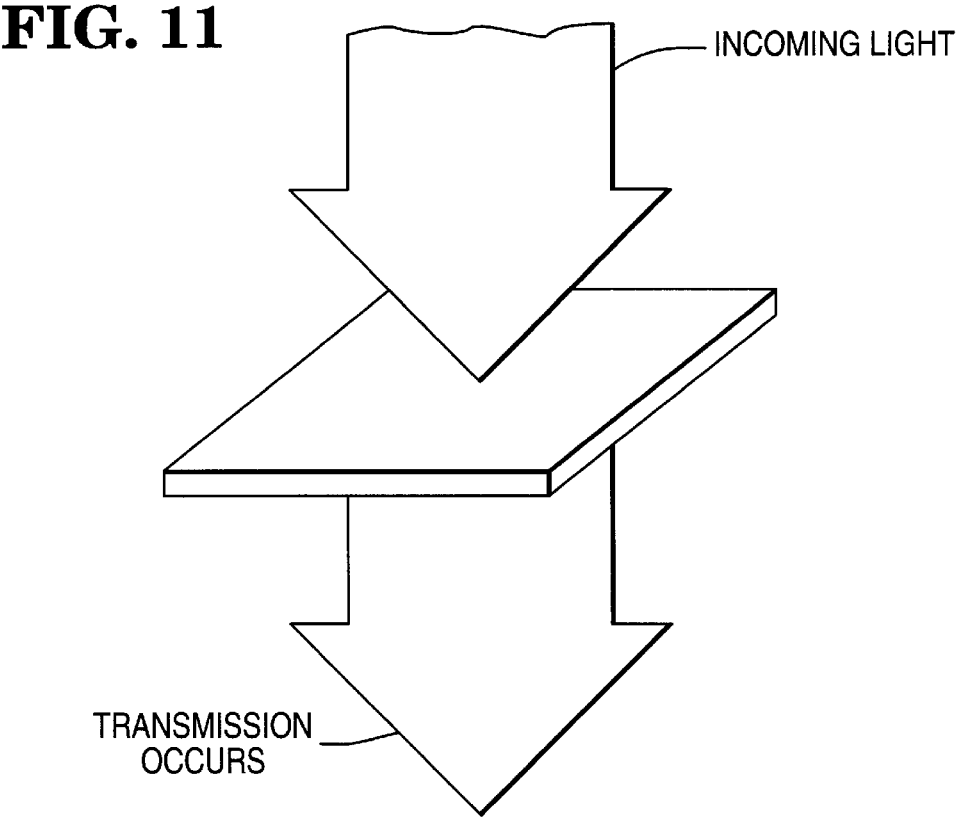
FIG. 11 illustrates a pixel which transmits light.
Figure 12:
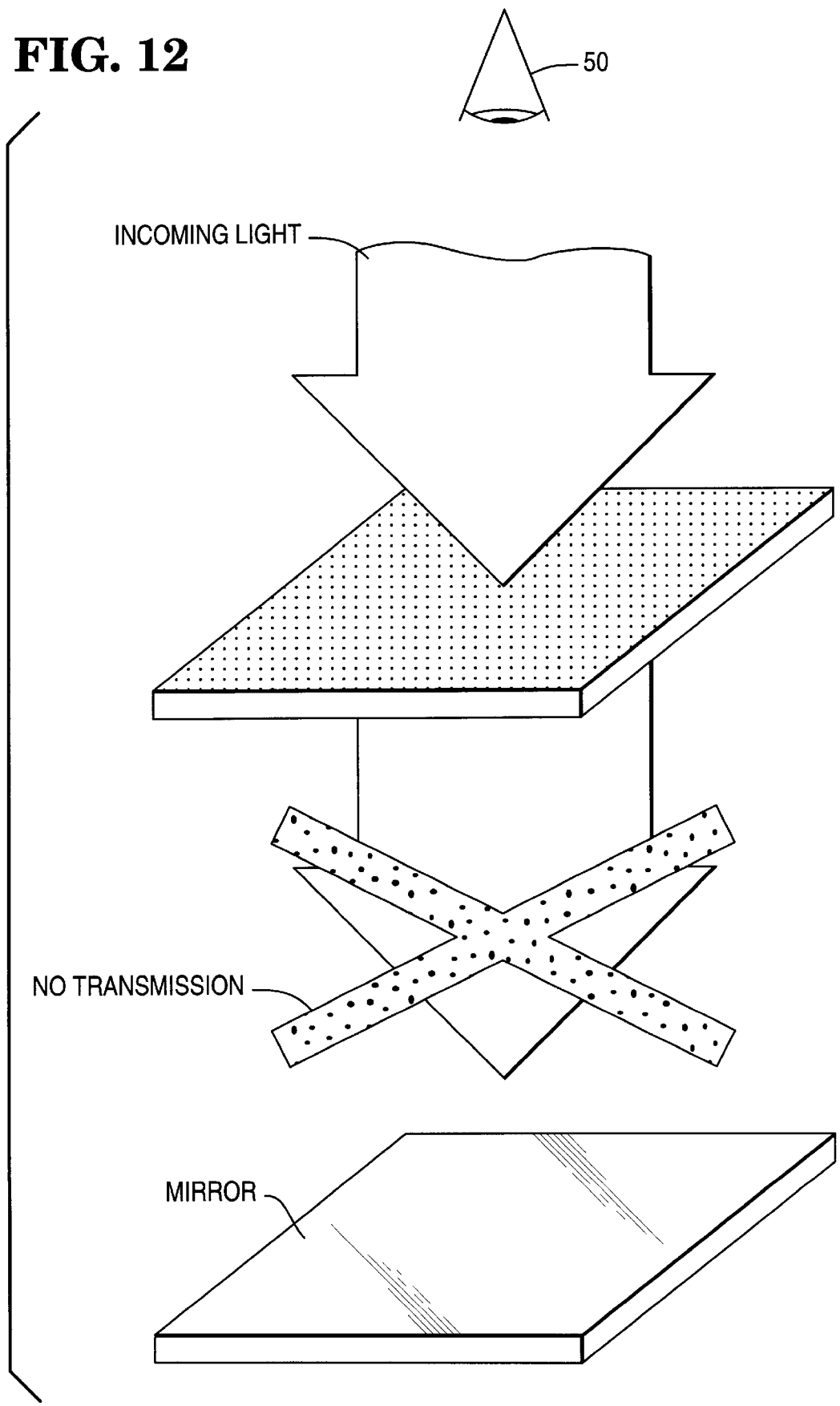
FIG. 12 illustrates how a pixel, backed by a MIRROR, appears dark when light is blocked.
Figure 13:
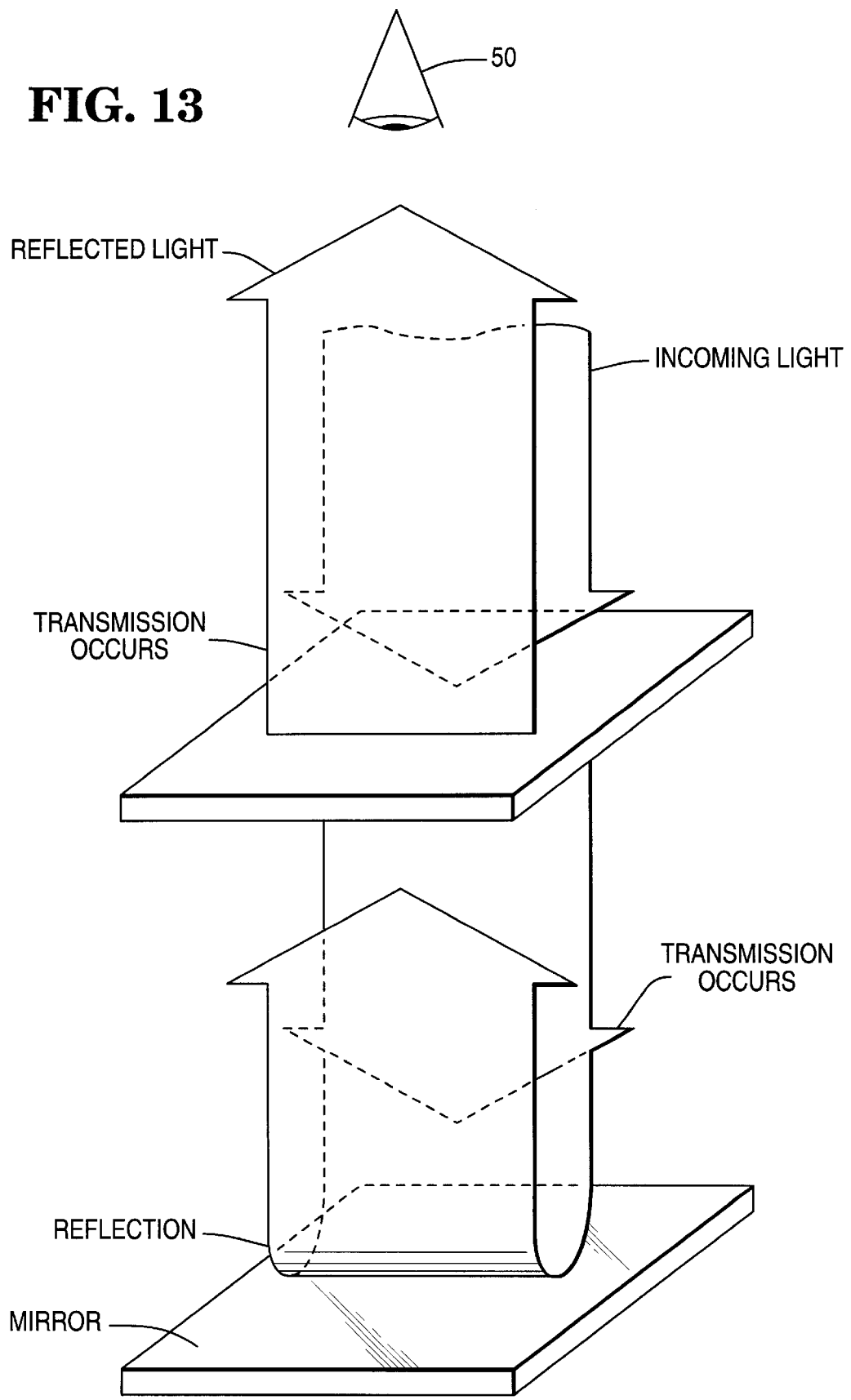
FIG. 13 illustrates how a pixel, backed by a MIRROR, appears bright when it is transmissive.
Figure 14:
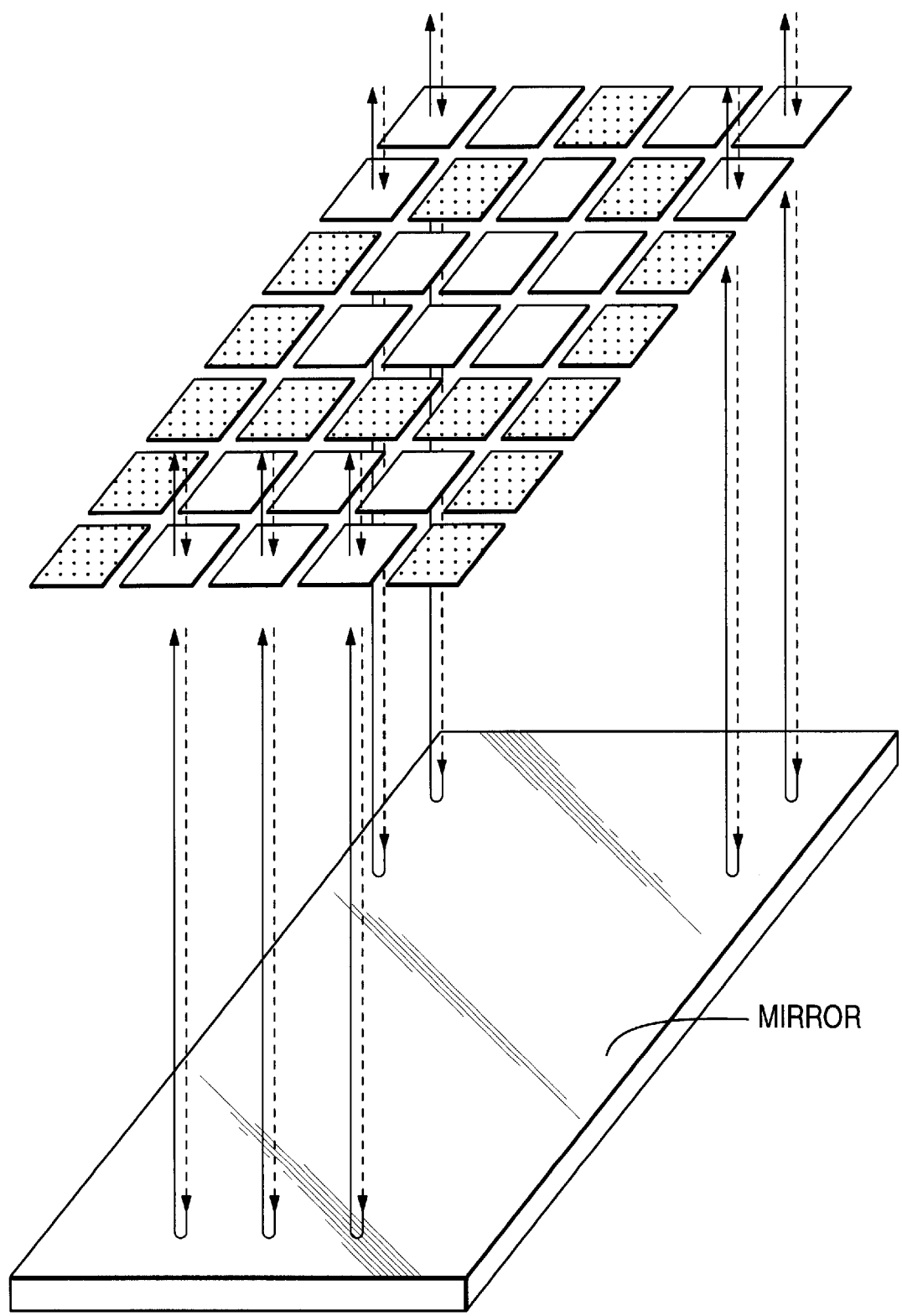
FIG. 14 illustrates how pixels can be arranged into a multi-pixel display.

A distinction should be noted between the light-handling properties of TN (Twisted Nemetic) and PDLC. The TN system is either transmissive, as in FIGS. 7 and 11, or absorptive, as in FIGS. 9 and 10.

The PDLC system is either transmissive, as in FIG. 20, or reflective, as in FIG. 19. This apparently simple difference is actually a three-fold set of differences, as can be explained with reference to the following TABLE:

TABLE

| Material | State | Electric Field |
|----------|--------------|----------------|
| TN | Transmissive | Removed |
| TN | Absorptive | Applied |
| PDLC | Transmissive | Applied |
| PDLC | Reflective | Removed |

The Table shows three major differences between the two systems:

(1) The non-transmissive state of TN is Absorptive. In contrast, the non-transmissive state of PDLC is Reflective.

(2) The transmissive state of TN is attained by removing (or reducing) electric fields. In contrast, the transmissive state of PDLC is attained by applying an electric field.

(3) The non-transmissive state of TN (ie, absorption) is attained by applying a field. In contrast, the non-transmissive state of PDLC (ie, reflection) is attained by removing fields.

Additional Embodiment

The scattering mode, which produces the paper white color, is used for direct-view displays, using the edge-illumination and black velvet (or equivalent) shown in FIG. 22. However, it is also possible to use the invention in a projection mode (as in projection, wall-sized video displays), wherein the display acts as a shutter, blocking light (as in FIG. 20) or projecting light (as in FIG. 19).

Figure 15:
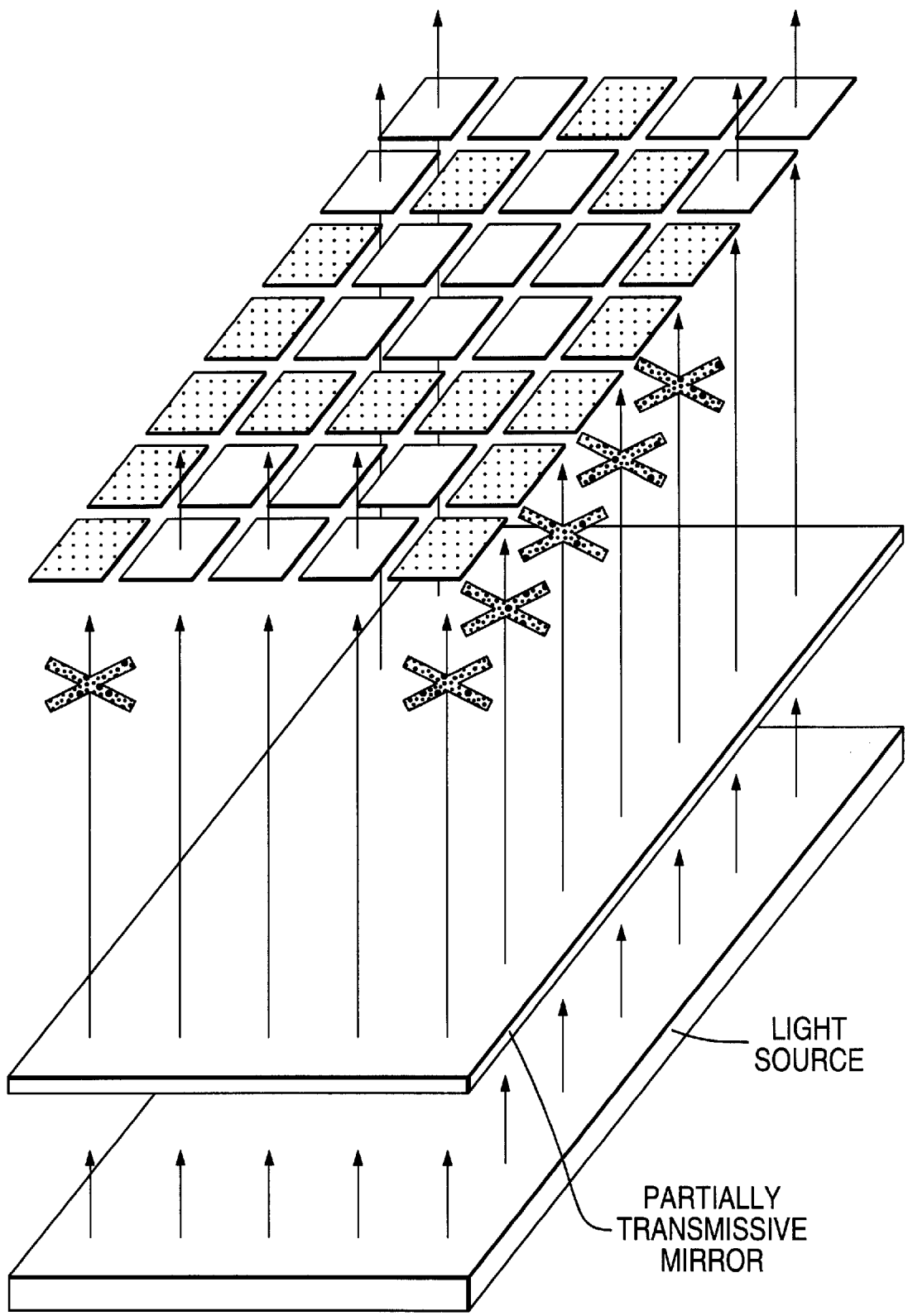
FIG. 15 illustrates the display of FIG. 14, but with a PARTIALLY TRANSMISSIVE MIRROR, and a LIGHT SOURCE, both for use in low ambient light conditions.
Figure 16:
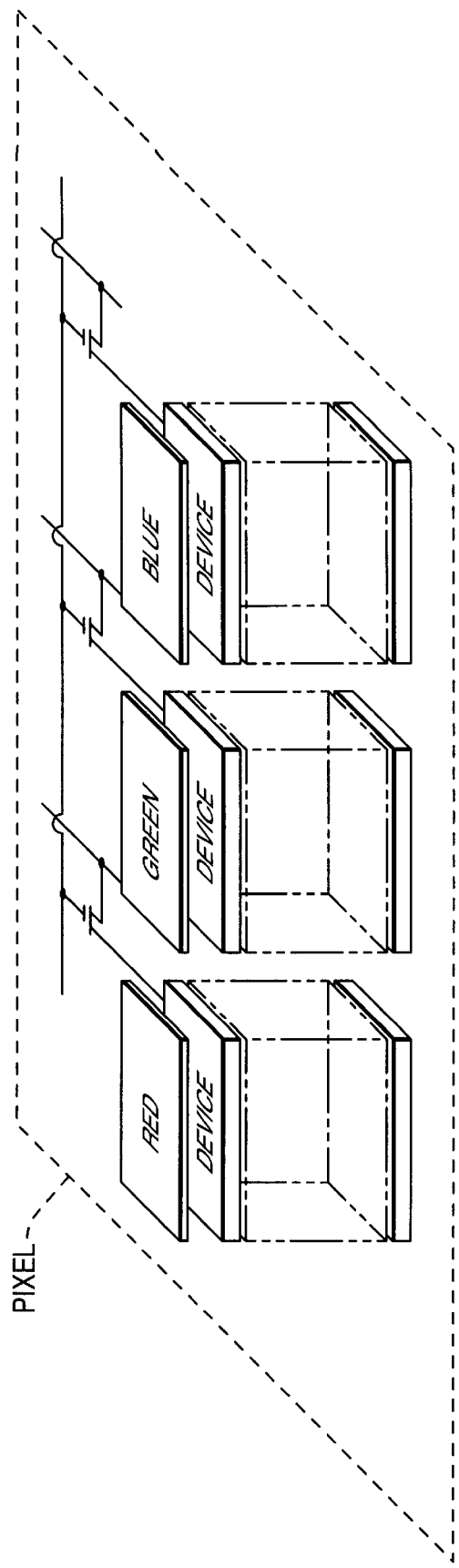
FIG. 16 illustrates how the LCD can produce colored PIXELs.
Figure 17:
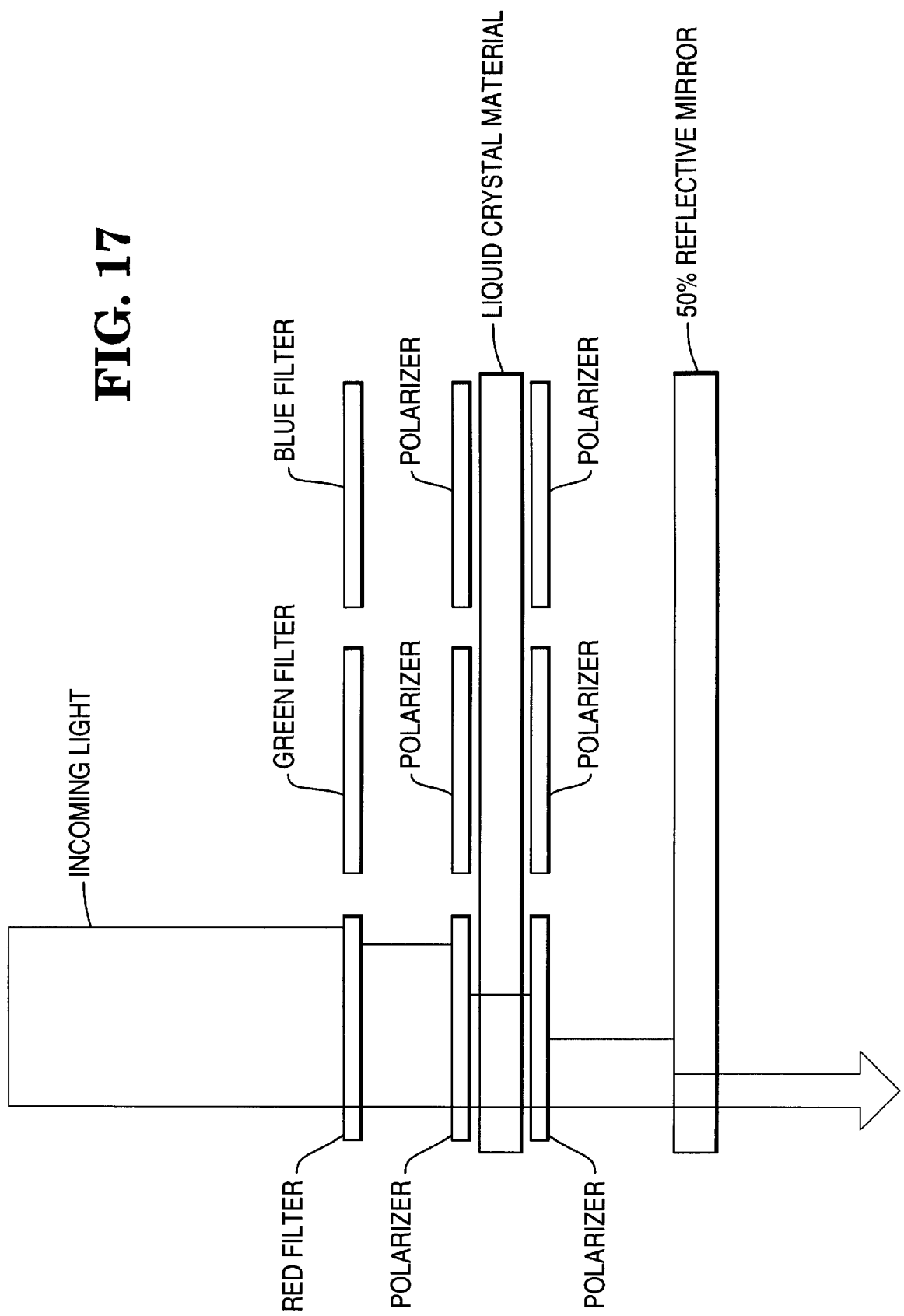
FIG. 17 illustrates an attenuation problem with the approach of FIG. 16.

FIG. 15 illustrates a simplified view of projection, although, in practice, two major modifications would be implemented. One is that a different light source would be used. The second is that the light source would be properly focused onto the shutter (ie, the letter A), and a lens system would be used to focus the image of the "A."

Present Invention Reduces Light Absorption

Figure 6:
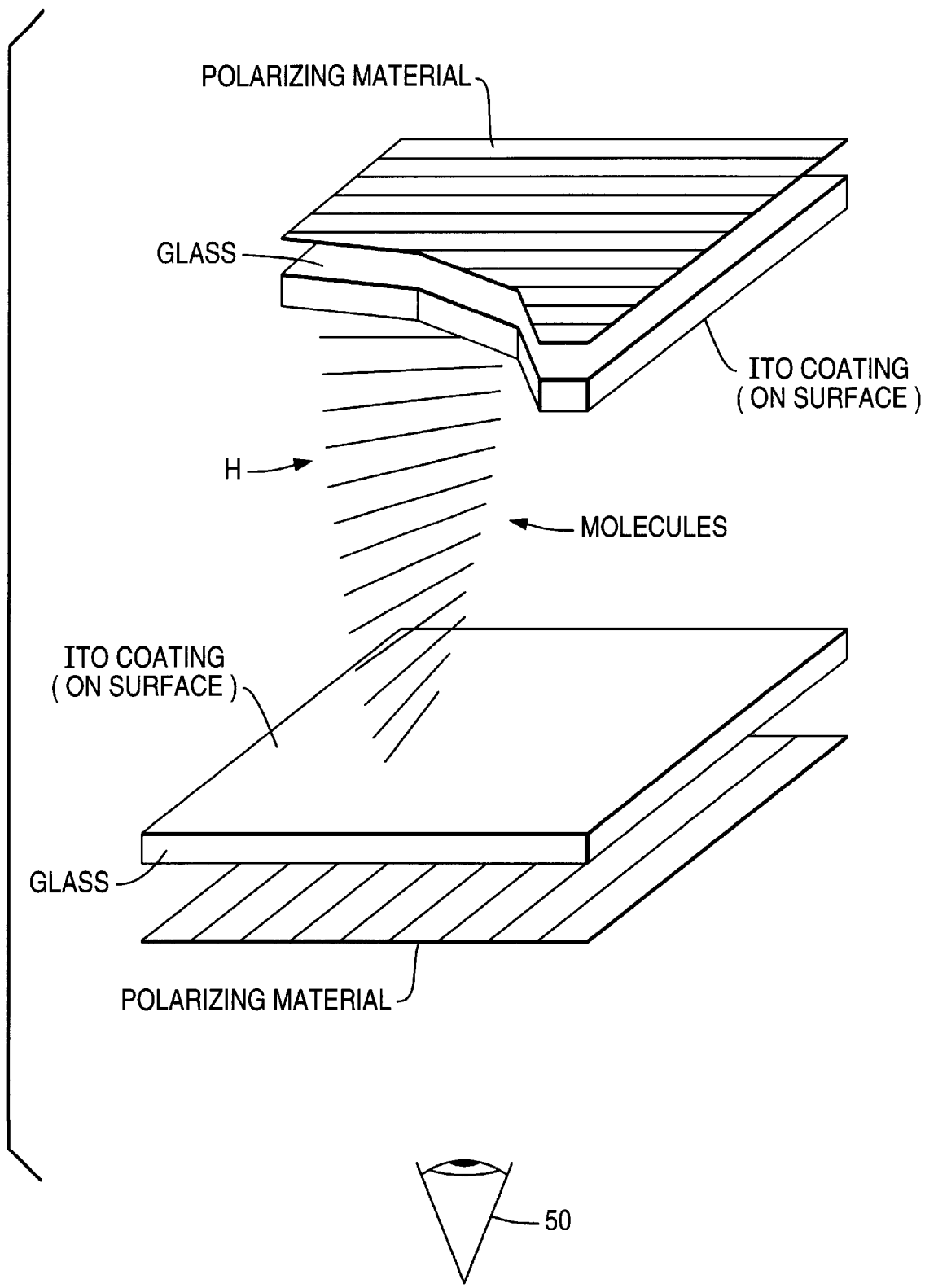
FIG. 6 illustrates molecules M1 and M2 inducing a HELIX between themselves.

The embodiment of the invention shown in FIG. 22 eliminates the POLARIZING MATERIAL used in the prior-art TN pixel shown in FIG. 6. This elimination is beneficial, because the polarizing filters are expensive, and they also absorb significant amounts of light. This absorption wastes the light absorbed, and requires, in the case of portable devices, a larger battery than necessary, because the battery must provide power to produce the light which is wasted.

A reasonable estimate of the relative absorption is that, in the transmissive state, the TN pixel attenuates about 50% of the incoming light. In contrast, in the transmissive state, attenuation in the PDLC pixel is nearly zero, and certainly less than both five percent and ten percent.

Thus, when a TN pixel is in the bright state, it attenuates 50%, or more, of the reflected light. In contrast, the PDLC pixel attenuates virtually no light, or certainly less than five percent, in the bright (reflective) state.

For example, the light passing through a BRIGHT pixel in the TN display shown in FIG. 7 will be attenuated by about 50%.

In contrast, for the PDLC display of FIG. 23, the light provided by source 30, and reflected by the bright pixel P3, is attenuated significantly less. The attenuation is certainly less than ten percent, and very close to zero. The bright P3 re-directs toward the viewer over 90 percent of the incoming light received from the source 30.

(The viewer's eye will not necessarily receive all of the re-directed light, because the viewer's eye occupies only a very small space over which the re-directed light is distributed. Nevertheless, all of the re-directed light is directed toward the side of the display on which the viewer is located.)

Viewed another way, the invention allows a liquid crystal display in a portable device to generate pixels which are bright, using a light source on-board the device, but with less than ten percent attenuation of the light. "Attenuation" is a term known in the art. One definition refers to diminution of light intensity occurring along the optical path from the light source to the plane at which reflected light exits the bright pixel. This plane can be represented by the plane of the ITO PLATES in FIG. 23. Less than ten percent attenuation occurs between points F and G.

(Attenuation does not include that attributable to the color filters R, G, and B. The attenuation due to the color filters can be highly variable, depending on the particular materials used.)

Nomenclature

The term Polymer-Dispersed Liquid Crystal (PDLC) is sometimes replaced by the term Nematic Curvilinear Aligned Phase (NCAP). The nomenclature has not yet become standardized.

Numerous substitutions and modifications can be undertaken without departing from the true spirit and scope of the invention. What is desired to be secured by Letters Patent is the invention as defined in the following claims.

What is claimed is:

1. An optical display, comprising:
   a) a sheet of polymer-dispersed liquid crystal;
   b) lighting means for off-normal illumination of the sheet; and
   c) different-colored filters, adjacent the sheet.

2. An optical display, comprising:
   a) liquid crystal material in which the liquid crystal takes the form of droplets supported in a sheet of a polymer matrix, and in which said liquid crystal material can be placed into
      i) a transmissive state, by application of an electric field; and
      ii) a reflective state, by reduction of said field;
   b) color filters, of different colors, through which light reflected in paragraph (a) (ii) passes; and
   c) lighting means, for edge-illuminating said sheet, for providing light for reflection by the liquid crystal when it resides in its reflective state.

3. An optical display, comprising:
   a) liquid crystal particles, dispersed within a sheet;
   b) means for edge-illuminating the sheet; and
   c) color filters, of two or more colors, through which light reflected by said particles can travel.

4. An optical display, comprising:
   a) a sheet of polymer-dispersed liquid crystal;
   b) a plurality of pixels defined within said sheet, each pixel containing three pairs of electrodes, such that:
      i) each pair of electrodes forms a capacitor
         A) in which liquid crystal forms at least part of the dielectric;
         B) through which light passes when a voltage is applied; and
         C) from which light is reflected when a lesser voltage is applied;
   c) a plurality of color filters, each associated with a capacitor, such that light reflected from a capacitor can pass through said filter, en route to a viewing region;
   d) lighting means for edge-illuminating said sheet, for providing the light which is reflected in paragraph (b) (i) (C).

* * * * *